Figure 1:
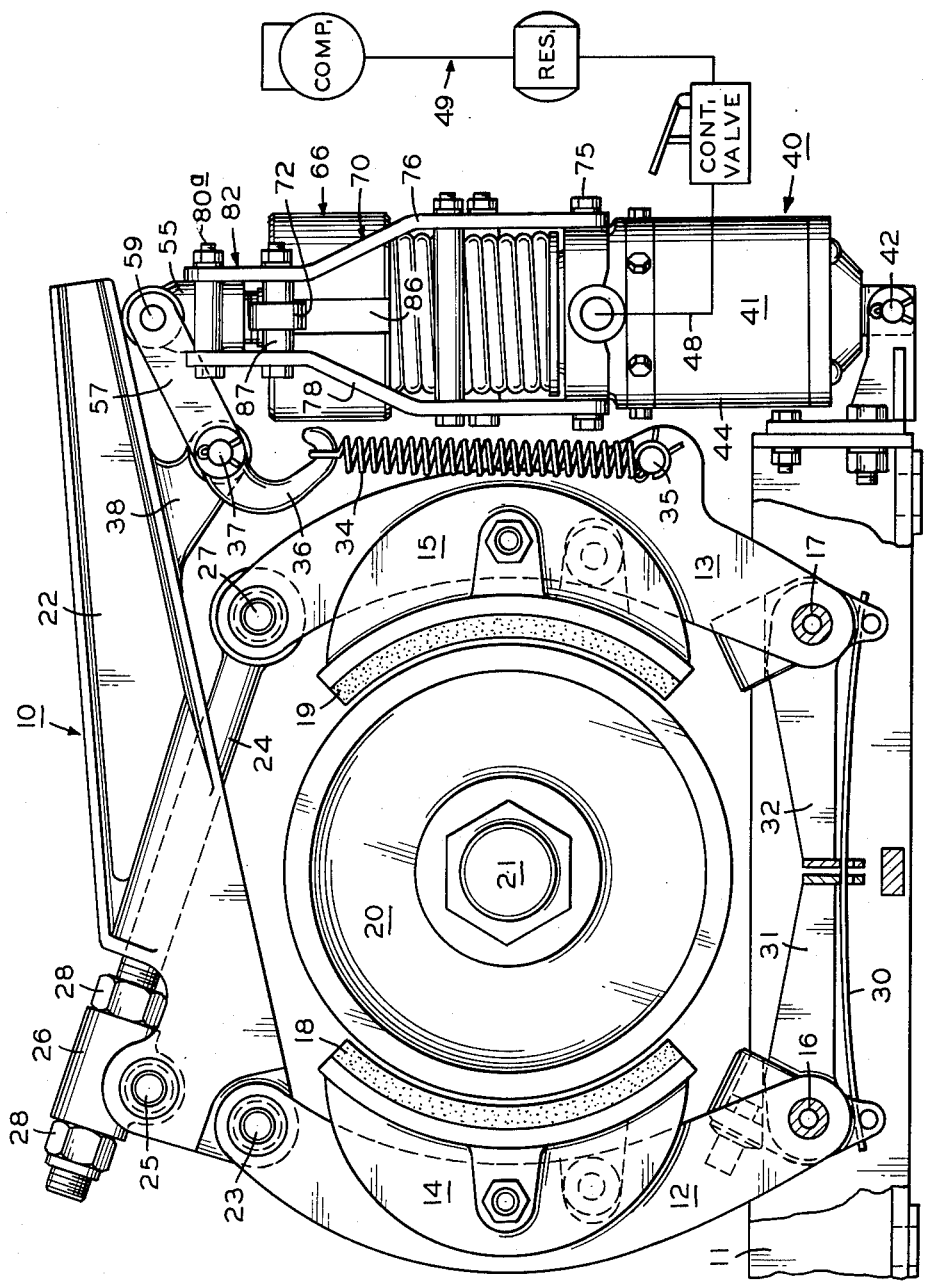

Oct. 26, 1965    N. E. EDWARDS    3,213,975
SPRING APPLIED FLUID PRESSURE RELEASE BRAKE
Filed Dec. 4, 1963    3 Sheets-Sheet 1

INVENTOR
NORMAN E. EDWARDS
BY William R. O'Meara

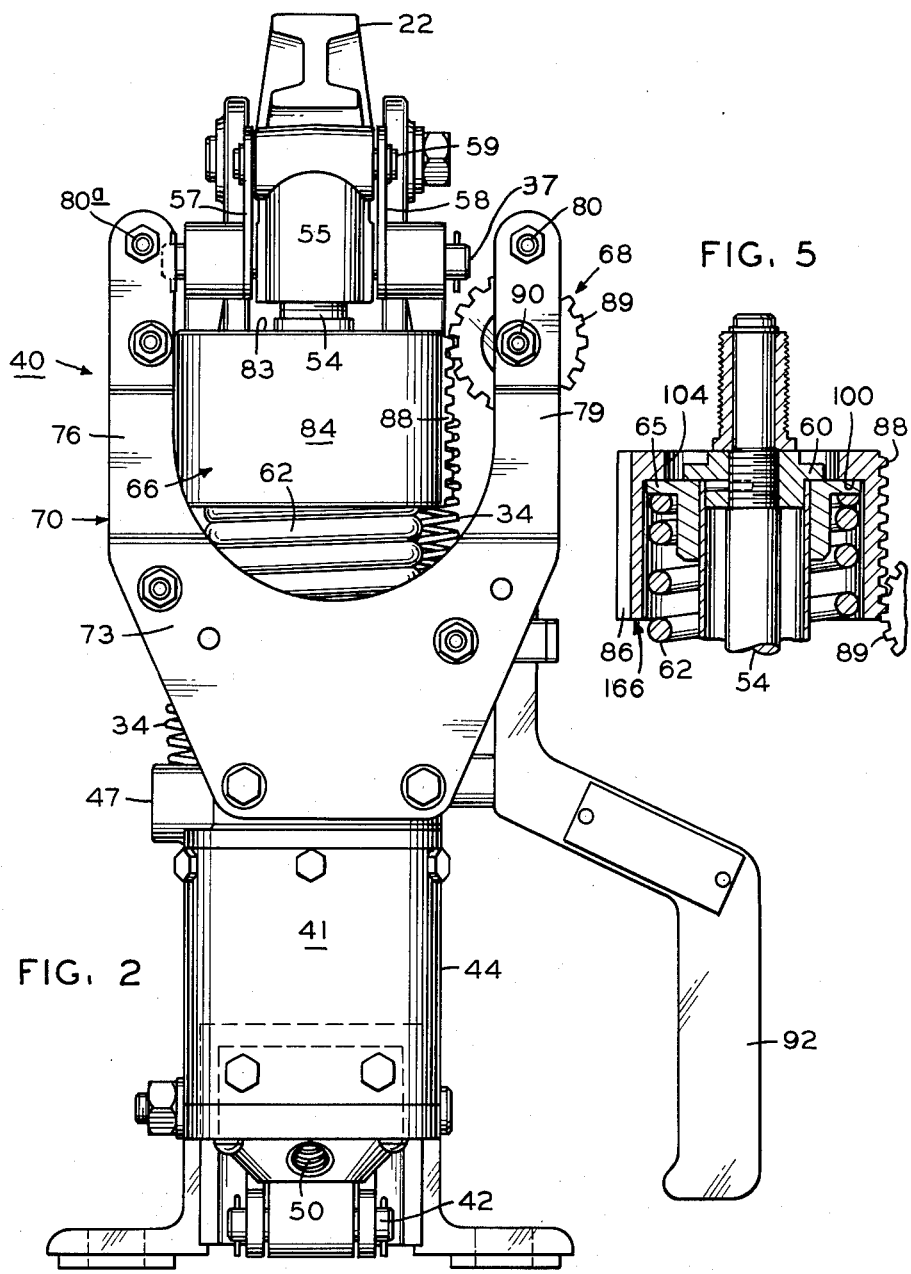

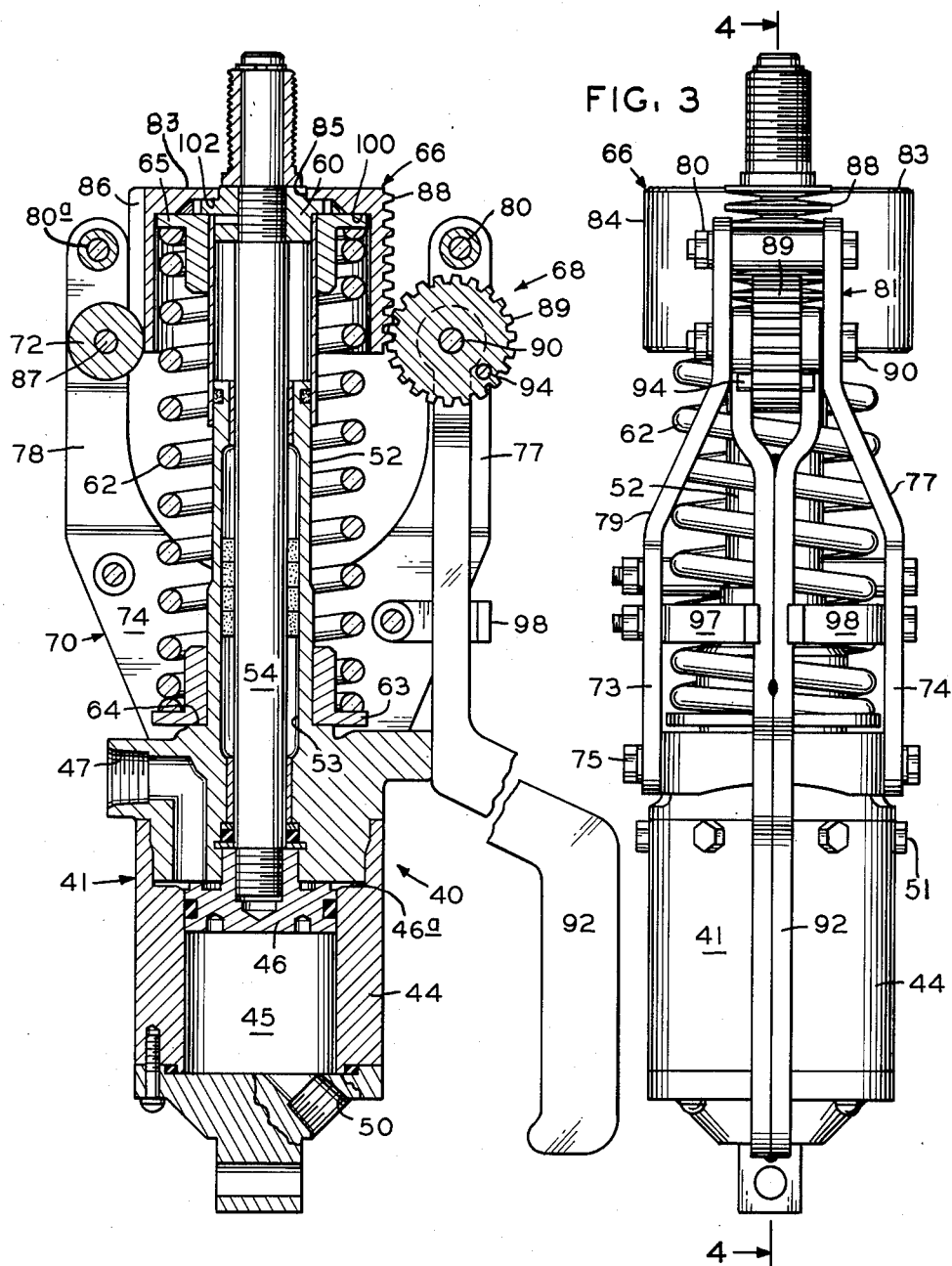

United States Patent Office 3,213,975
Patented Oct. 26, 1965

3,213,975
SPRING APPLIED FLUID PRESSURE RELEASE BRAKE
Norman E. Edwards, Bridgeton, Mo., assignor to Wagner Electric Corporation, St. Louis, Mo., a corporation of Delaware
Filed Dec. 4, 1963, Ser. No. 327,963
9 Claims. (Cl. 188—170)

This invention relates to friction devices and more particularly to actuating means thereof including manual release means.

In the past, certain manual brake releasing arrangements for spring applied friction devices, such as brakes, included a hand lever coupled directly to the movable friction member or members of the device through additional parts, such as push rods, cams, etc., with a part engaging and urging the friction member or members from the relatively rotatable friction element associated therewith. These additional parts complicated the brake mechanism and considerably added to the cost thereof. In some spring applied brakes of the power actuated type, it was necessary to dismantle the brake in order to release the brake upon the occurrence of a malfunction in the power actuating means.

It is therefore an object of the present invention to provide a novel friction device of the spring applied type having improved manual control means, and which is especially simple and economical in construction and reliable in operation.

Another object is to provide a friction device of the type having resilient means normally urging a friction member of the device into engagement with an associated relatively rotatable member, and which is provided with novel manual release means for effecting disengagement of the relatively rotatable members.

Another object is to provide novel actuating means for controlling the operation of a friction device of the spring applied type wherein the actuating means are provided with novel manual control means which provide smooth control.

Another object is to provide novel actuating means for controlling the operation of a friction device which not only has power means for controlling the friction device under normal operating conditions, but which also provides simple and reliable means for manually operating the friction device to permit operation thereof in the event of a malfunction in the power means.

Another object is to provide a novel brake mechanism having relatively simple and inexpensive power actuating means incorporating manual brake release means which obviates the need of manual brake release apparatus separate from the power actuating means.

These and other objects and advantages will become more apparent hereinafter.

Briefly, in accordance with one aspect of the present invention, a friction device is provided that includes a friction member movable into frictional engagement with a relatively rotatable element and actuating means having resiliently urged means for urging the friction member into frictional engagement with the rotatable element, and manual control means for opposing the resiliently urged means to effect disengagement of the friction member from the rotatable element.

In the drawings which illustrate embodiments of the invention,

FIGURE 1 is an elevational view of a friction device embodying the present invention, FIGURE 2 is an enlarged right side view of the friction device of FIGURE 1, FIGURE 3 is an enlarged elevational rear view of the actuating means of the friction device of FIGURE 1, FIGURE 4 is a cross-sectional view taken along line 4—4 of FIGURE 3, and FIGURE 5 is a partial sectional view of the upper end of an actuating means of modified form.

Referring now to the drawings, there is shown in FIGURES 1 and 2 a friction device illustrated in the form of a brake mechanism indicated generally at 10 which may be used for example, to control the operation of a winch. The brake mechanism 10 includes a base or support 11 upon which two brake levers 12 and 13 carrying brake shoes 14 and 15, respectively, are pivotally connected by pins 16 and 17, respectively. The brake shoes are provided with linings 18 and 19 for engagement with a rotatable drum 20 secured to a rotatable shaft 21. A substantially L-shaped actuating lever 22 is pivotally connected at its toe end to the upper end of lever 12 by a pin 23 and at its heel end to one end of a link 24 by a pin 25 extending through a coupling element 26 which receives the link 24. The other end of link 24 is pivotally connected to the upper end of lever 13 by a pin 27. The coupling element is adjustably positioned on the link 24 by means of nuts 28 to adjust the effective length of link 24 and predeterminately locate the brake shoes 14 and 15 relative to the drum 20. The brake is provided with a shoe-centering mechanism which includes a shoe-centering leaf spring 30 and a pair of shoe-centering arms 31 and 32 pivotally connected to the lower ends of the levers 12 and 13, respectively. The free ends of arms 31 and 32 are urged by spring 30 toward the drum with the arms engaging and urging the lower ends of the levers 12 and 13 apart to maintain centering of the shoes. A pair of lever return springs 34 is connected at one end to lever 13 by a pin 35 and at the other end to an arm 36 pivotally connected by a pin 37 to a depending portion 38 disposed adjacent to but spaced from the right-hand end of the actuating lever 22.

An actuator 40, which provides the actuating means for controlling the operation of the brake, is disposed between the support 11 and the outer or right-hand end portion of the actuating lever 22 to control the movement of lever 22 for selectively energizing and de-energizing the brake.

The actuator 40 includes a housing 41 pivotally connected at its lower end to the support 11 by a pin 42. As seen in FIGS. 3 and 4, the housing 41 includes a power actuating cylinder 44 having a bore 45 therein in which a piston 46 is slidably mounted for axial movement, the piston 46 defining with the bore an expansible power or actuating chamber 46a. An inlet or working port 47 communicating with the bore 45 on one side of the piston 46 is connected by a conduit 48 (see FIGURE 1) to the outlet or delivery side of a pressure fluid system 49 which is shown for illustration as including pressure generating means, such as for instance a compressor, a reservoir and a control valve, for supplying pressure fluid to the bore 45. The cylinder is also provided with a vent port 50 communicating with the bore 45 on the opposite side of the piston 46.

The housing 41 is also provided with an axial extension 52 connected to the cylinder 44 by means of a plurality of bolts 51. The extension 52 has a bore 53 therethrough which guides an actuating piston rod 54 for axial movement. The piston rod 54 extends through bore 53 and is rigidly connected at one end to piston 46. The opposite end of the piston rod, as seen in FIGS. 1 and 2, threadedly receives an enlargement or rod end 55 which is shown for purposes of illustration as a separate member. A pair of links 57 and 58 is pivotally connected to the rod end 55 by means of a through pin 59. The rod end 55 is provided with a rounded surface at its upper end which engages the lever 22 adjacent the right-hand end thereof. The two links 57 and 58 are also connected to lever 22 by the pin 37. The piston rod 54 is provided with a flange 60, FIG. 4, adjacent the free end thereof at a predetermined distance from the cylinder 44. Disposed between the flange 60 and the cylinder 44 is a power spring 62 which biases the piston rod in a brake energizing direction. In the illustrated embodiment, the spring 62 is disposed concentrically with the extension 52 and piston rod 54 and includes a lower spring retainer 63 engaging a flange 64 on the external surface of the housing 41, and an upper spring retainer 65 which engages the piston rod flange 60.

When the fluid pressure control valve is actuated to apply fluid pressure from the reservoir into the chamber 46a of the cylinder 44 in excess of a predetermined amount, the piston 46, rod 54, and flange 60 are moved downwardly from their position shown in FIGURE 4, to compress or overcome the force of spring 62 so that the brake will be in its de-energized condition with the brake shoes 14 and 15 disengaged from the drum, the brake being shown in its de-energized condition in FIGURES 1 and 2. If the fluid pressure in the chamber 46a is now reduced, the force of spring 62 will move the piston rod flange 60, rod 54, and piston 46 upwardly whereby the rod end 55, FIG. 1, will urge the right-hand end of actuating lever 22 upwardly to move brake shoes 14 and 15 into frictional engagement with the drum 20 and effect energization of the brake.

While the piston rod 54 is moving upwardly from its position shown in FIGURE 1, the housing 41 of the actuator pivots at pin 42 since the rod end 55 is connected to the lever 22 by the links 57 and 58. In this way, the rod end drives the lever 22 and remains in engagement therewith during the energizing stroke of the piston rod 54. On the return or de-energizing stroke of the piston rod 54, the lever 22, of course, follows the piston rod down as the actuating cylinder pivots outwardly from the brake to its vertical position as shown in FIGURE 1.

Referring generally now to FIGS. 2, 3 and 4, the manual control means for the brake, which will be described in greater detail hereinafter, includes a manually driven cup-shaped brake control or release member 66 normally urged upwardly in the brake applying or energizing direction by the power spring 62, and manually operable drive means, indicated generally at 68, for moving the member 66 in a downward direction to compress spring 62 or overcome the force thereof for controllably releasing or de-energizing the brake. A frame 70 connected to the housing supports the drive means 68 and also a guide roller 72 which serves to guide the cup-shaped member 66 during axial movement thereof.

The frame 70 includes a pair of generally U-shaped plates 73 and 74 connected to diametrically opposite sides of the housing 41 by means of bolts 75. Plate 73 has a pair of axially extending arms 79 and 76 which face a pair of similar axially extending arms 77 and 78 of plate 74. The arms 79 and 77 converge toward each other and are connected at the upper ends thereof by a bolt 80 to form a frame arm indicated generally at 81 in FIGURE 3, which is disposed on one side of the upper portion of the spring 62. The other arms 76 and 78 of the plates are connected at the upper ends thereof by a bolt 80a and form another similar frame arm, indicated generally at 82 in FIGURE 1, which is disposed on the diametrically opposite side of the upper portion of spring 62.

The release member 66 includes an annular radially extending base portion 83 and a cylindrical or annular axially extending portion 84 integrally formed with the base portion. The release member 66 is disposed concentrically with the spring 62 and piston rod 54 and with the cylindrical portion 84 disposed between the frame arms 81 and 82 and receiving the upper portion of spring 62. The piston rod extends through a central opening 85 in the base portion 83. If desired, the release member 66 may be rigidly connected to the piston rod 54, such as by providing each with complementary threaded portions (not shown). An axially extending groove 86 in the peripheral surface of cylindrical portion 84 receives the guide roller 72 which is mounted for rotation between arms 76 and 78 of frame arm 82 by a pin 87 so that release member 66 is guided for axial movement in either direction. The periphery of the roller 72 engages the bottom of the groove 86 and the opposed sides of the roller are engageable with the opposed side walls of the groove so as to maintain the release member 66 in axial alignment with the shaft and spring during axial movement thereof.

An axially extending rack gear 88 is provided on the cylindrical portion 84 on the side thereof diametrically opposite the groove 86. The rack gear 88 of the release member is driven by the manual drive means 68 which includes a pinion gear 89 mounted for rotation on frame arm 81 between arms 79 and 77 by a pin or bolt 90 with the gear 89 drivingly engaged with the rack gear 88. A manual operating brake control or release handle 92 is pivotally mounted to the frame arm 81 at the upper end thereof by the pin 90. As shown in FIGURE 3, the upper end of the handle 92 is fork-shaped and straddles the pinion gear 89. When the handle 93 is pivotally moved outwardly from the housing 40, it engages a pin 94 secured to the pinion gear 89 to effect rotation of the pinion gear. The pin 94 is shown extending through gear 89 with both of the opposite ends thereof in the path of movement of the fork end of the handle 92. The pin 94 is located on gear 89 relative to the handle 92 such that pinion gear can rotate due to its driving connection with rack 88 durin normal opertion of the actuatin cylinder. As viewed in FIGURE 4, the pin 94 is disposed adjacent to and on the right-hand side of the handle 92 when the actuating cylinder is in its brake energizing condition, which is the condition illustrated in FIGURE 4. Thus, when the handle is moved outwardly from the actuating cylinder it engages pin 94 effecting rotation of gear 89 which, in turn, moves rack gear 88 axially downwardly against the force of spring 62 to compress or overcome the force of the spring to controllably release or de-energize the brake.

The handle 92 is retained in its normally inactive position, the position shown in the drawings, by means of a clip having resilient arms 97 and 98, FIG. 3, connected respectively to the U-shaped plates 73 and 74 of the frame. The resilient arms 97, 98 are resiliently deformed by the handle when it passes between them in response to an applied force on the handle but maintains the handle in the position shown when not in use.

The release member 66 is illustrated in FIGURE 4 as having an annular land 100 engaging the upper retainer 65 of spring 62, and an annular land 102 radially inwardly of an axially spaced from land 100 which is engageable with the piston rod flange 60, the land 100 and 102 being on the inside walls of the annular radially extending portion 83. In this arrangement, it will be apparent that when the release member 66 is moved downwardly in response to the rotation of gear 89, the lands 100 and 102 on the release member 66 will urge the retainer 65 and piston rod flange 60 downwardly to de-energize the brake.

In normal operation, when the fluid pressure in the chamber 46a of the cylinder 44 is increased above the predetermined value by the application pressure fluid from the fluid pressure system 49, piston 46 moves downwardly in the bore 45 from the position shown in FIGURE 4 to thereby move the piston rod 54 and flange 60 downwardly to compress spring 62. When the piston rod moves downwardly, the lever return springs 34 effect downward movement of the actuating lever 22 so that the brake shoes 14 and 15 move outwardly from the brake drum. During this downward movement of the piston rod, the release member 66 moves downwardly due to its weight and effects counterclockwise rotation of pinion gear 89, as viewed in FIGURE 4.

When it is desired to energize the brake, the fluid pressure in the chamber 46a is reduced below the value necessary for maintining the brake de-energized and the spring retainer 65, piston rod 54, piston 46, and the release member 66 are resiliently urged upwardly from the cylinder 44 by the force of spring 62 whereby the piston rod end 55 urges the right-hand end of the lever 22 upwardly. The upward movement of lever 22 moves the upper ends of the brake levers 12 and 13 inwardly to thereby move the brake shoes 14 and 15 into frictional engagement with the drum 20 and thereby effect energization of the brake. During this upward movement of the release member 66 the pinion gear 89 rotates in a clockwise direction, the gear 89 being free to rotate back to the position shown in FIGURE 4.

When it is desired to control the brake of the present invention manually, for example, in event of a malfunction in the pressure fluid system 49, such as a break in a pressure fluid line or the like, the handle 92 is manually pivoted toward and away from housing 41 to effect energization and de-energizion of the brake. For example, when the brake is energized and it is desired to manually de-energize the brake, the handle is pivoted outwardly by a manually applied force thereon from its position shown in FIGURE 4. As the handle is pivoted outwardly, the fork-end thereof engages the ends of pin 94 on the pinion gear 89 and effects rotation of gear 89. Rotation of gear 89 drives the rack gear 88 on the release member 66 downwardly thereby urging the upper portion and retainer 65 of the spring 62 downwardly, as viewed in the drawings, to compress or overcome the compressive force of the spring. As the release member is driven downwardly it also engages the piston rod flange to move the piston rod downwardly and effect de-energization of the brake. The guide roller 72 which is diametrically opposite the pinion gear 89 rolls in groove 86 to maintain the release member in aligned relation during the movement thereof.

If it is now desired to manually energize the brake from the above described de-energized condition, the manually applied force on the handle 92 is reduced so that the force of spring 62 moves the piston rod flange 60 and the release member 66 upwardly to energize the brake. During this upward movement of the release member 66, the force of spring 62 is transmitted through the rack and pinion gears to gear pin 89 and handle 92 so as to permit controlled release of the brake by controlling the manually applied force opposing movement of the handle.

It will be apparent that there has been provided a relatively simple and effective friction device and actuating means therefor incorporating novel manual control means which is highly reliable and effective in operation.

In the modified embodiment illustrated in FIGURE 5, the numeral 166 indicates a modified form of release member which has a relative large central opening 104 through which the piston rod 54 extends. The land 100 of the release member 166 engages the retainer 65 of spring 62 for urging the spring downwardly in the brake de-energizing direction in response to a manually applied force on the operating handle 92 but the release member does not engage the piston rod flange 60. Thus, when the release member 166 is urged downwardly by a manually applied force on handle 92 to overcome the force of power spring 62 and de-energize the brake, the lever return springs 34 supply the primary force tending to move the piston rod 54 downwardly.

It is now apparent that a novel friction device and actuating means therefor meeting the objects set out hereinbefore are provided and that changes or modifications to the precise configurations, shapes or details of the constructions set forth in the disclosure by way of illustration may be made by those skilled in the art without departing from the spirit and scope of the invention as defined by the claims which follow.

The embodiments of the invention in which an exclusive property or privilege is claimed are defined as follows:

1. Actuating means for operating a brake comprising an actuating cylinder, fluid pressure responsive piston means movably mounted in said cylinder and defining therein an expansible fluid pressure chamber, means for introducing pressure fluid into said chamber, actuator means connected to said piston means and extending axially from said cylinder for connection with said brake, flange means on said actuator means, spring means between said cylinder and said flange means resiliently urging said actuator means in a brake energizing direction, said piston means being movable in response to fluid pressure in said chamber above a predetermined amount to move said actuator means in the brake de-energizing direction, frame means connected to said cylinder and including axially extending arms disposed on opposite sides of said actuator means, rack means connected with said flange means and urged by said spring means in said brake energizing direction, guide means on one of said arms guiding said rack means for axial movement, and manual operator control means including a manual operating arm pivotally mounted to the other of said arms, gear means rotatably supported on said other arm and geared with said rack means, and means coupling said arm with said gear means, said gear means being movable in response to movement of said arm to move said rack means and said flange means in a brake de-energizing direction for overcoming the force of said spring means.

2. Means for controlling energization and de-energization of a brake device comprising a power cylinder, fluid pressure responsive piston means slidably mounted in said cylinder and defining therewith an expansible fluid pressure chamber, means for introducing fluid pressure into said chamber, guide means on said cylinder having an inner cylindrical surface, a piston rod extending through said guide means and guided on said inner surface for axial movement, said rod having one end connected to said piston means for concert movement therewith and the other end thereof for operative connection with said brake, flange means on said rod adjacent to said other end and spaced from said cylinder, spring means biased between said cylinder and said flange means and disposed concentrically with said guide means and rod normally urging said rod in a brake energizing direction, said piston means being movable in response to fluid pressure in said chamber above a predetermined amount to move said rod in a brake de-energizing direction against the compressive force of said spring means, a frame connected with said cylinder having a pair of axially extending arms disposed adjacent to diametrally opposite sides of said spring, an axially movable brake release member on said rod adjacent to said other end and normally engaged with said flange means, said brake release member being disposed between said frame arms and having an annular wall portion with a plurality of successive groove means on the periphery thereof, a drive member rotatably mounted on one of said frame arms and having teeth thereon in driving engagement with said groove means on said brake release member, other guide means extending between the other of said frame arms and said brake release member to guide said brake release member for axial movement, a manual operating lever pivotally mounted on said one frame arm, and driving connection means between said lever and said drive member to effect rotation thereof in response to pivotal movement of said lever, said lever being pivotally movable in response to an applied force thereon to rotate said drive member and effect further driving engagement of said teeth with said groove means to concertly move said break release member and rod in a brake de-energizing direction against the compressive force of said spring means.

3. In a friction device adapted for coaction with a relatively rotatable drum comprising support means, a pair of friction members mounted on said support means for frictional engagement with said drum, and linkage means interconnected between said friction members to effect movement of said friction members into and out of frictional engagement with said drum, actuator means including a housing having one end connected with said support means, a pair of stepped bores in said housing, piston means slidable in one of said stepped bores and defining therewith an expansible pressure fluid chamber, a piston rod slidable in the other of said stopped bores, said piston rod having an interior end connected with said piston means and an exterior end axially spaced from the other end of said housing and operatively connected with said linkage means, flange means on said piston rod adjacent to the exterior end thereof, spring means substantially coaxial with said piston rod and biased between the other end of said housing and said flange means to normally urge said piston rod and linkage means in a direction to frictionally engage said friction member with said drum, means for introducing fluid pressure into said chamber, said piston means being movable in response to fluid pressure in said chamber to move said piston rod and linkage means in an opposite direction against the compressive force of said spring means to disengage said friction members from said drum, and means for manually moving said piston rod and linkage means in the opposite direction to disengage said friction members from said drum against the compressive force of said spring means including a pair of arm members each having an end connected with said housing and a free end, said arm members being substantially coaxial with said piston rod and spring means, a cup-shaped member including an annular radially extending base portion integrally formed with an annular axially extending sleeve portion, said base portion being normally in abutting engagement with said flange means and substantially coaxial with said piston rod and said sleeve portion being radially spaced between said spring means and said arm members adjacent to the free ends thereof, an axially extending rack gear on the peripheral surface of said sleeve portion and substantially in radial alignment with one of said arm members, an axially extending groove on the peripheral surface of said sleeve portion and substantially in radial alignment with the other of said arm members, a pinion gear rotatably mounted on said one arm member adjacent to the free end thereof and in driving engagement with said rack gear, guide means on said other arm member adjacent to the free end thereof and extending into said groove, and a manual operating lever pivotally mounted on said one arm member and drivingly connected with said pinion gear, said lever being pivotally movable in response to an applied force thereon to rotate said pinion gear into further driving engagement with said rack gear to concertly move said cup-shaped member, flange means, piston rod and linkage means in the opposite direction to overcome the compressive force of said spring means and disengage said friction members from said drum.

4. Operating means for a friction device comprising a housing, actuating means movable in said housing and having an end exteriorly of said housing for operative connection with said friction device, other means including driven means on said actuating means adjacent to said exterior end thereof, resilient means connected between said housing and said other means and normally urging said actuating means in one direction to effect friction device energization, rotatable means mounted on said housing for rotatable driving engagement with said driven means, and selectively operable means pivotally mounted on said housing for driving engagement with said rotatable means, said selectively operable means being movable in response to an applied force to drivingly rotate said rotatable means and thereby drive said driven means in a direction opposite to the one direction to overcome the force of said resilient means for de-energizing said friction device.

5. The operating means according to claim 4 comprising guide means on said housing opposite to said rotatable means and in guiding engagement with said other means.

6. The operating means according to claim 4 wherein said actuating means defines with said housing an expansible fluid pressure chamber, said actuating means being movable in the direction opposite the one direction against the force of said resilient means in response to fluid pressure in said chamber for de-energizing said friction device.

7. The operating means according to claim 4 comprising coupling means on said rotatable means for engagement with said selectively operable means in response to the applied force movement thereof to effect the driven rotation of said rotatable means, means within said housing including said actuting means defining an expansible fluid pressure chamber, said actuating means being movable in the direction opposite to the one direction against the force of said resilient means in response to fluid pressure in said chamber for de-energizing said friction device, and said driven means being also movable in response to the fluid pressure movement of said actuating means to effect rotation of said rotatable means and coupling means relative to said selectively operable means.

8. Operating means for a friction device comprising a housing, actuator means movable in said housing and having an end exteriorly of said housing for connection with said friction device, flange means on said actuator means between said exterior end thereof and said housing, resilient means between said housing and said flange means normally urging said actuator means in a friction device energizing direction, rack means on said flange means and normally urged by said resilient means in the friction device energizing direction, gear means rotatably mounted on said housing and drivingly geared with said rack means, manual means pivotally mounted on said housing, and means for coupling engagement between said manual means and said gear means, said manual means being pivotally movable in response to an applied force thereon to effect rotation of said gear means and move said rack means and flange means in a friction device de-energizing direction to overcome the force of said resilient means.

9. Operating means for a friction device comprising an actuator cylinder, fluid pressure responsive means movably mounted in said cylinder and defining therewith an expansible fluid pressure chamber, actuator means connected to said pressure responsive means and having an end exteriorly of said cylinder for connection with said friction device, flange means on said actuator means between said exterior end thereof and said cylinder, resilient means between said cylinder and said flange means normally urging said actuator means in a friction device energizing direction, said pressure responsive means being movable in response to fluid pressure in said chamber to move said actuator means in a brake de-energizing direction, rack means connected with said flange means, guide means connected with said cylinder and in guiding engagement with said flange means, gear means rotatably mounted on said cylinder opposite said guide means and drivingly geared with said rack means, and manually pivotally mounted on said cylinder for driving engagement with said gear means, said manual means being pivotally movable in response to an applied force thereon into driving engagement with said gear means to effect rotation thereof and move said rack means and flange means in a friction device de-energizing direction against said resilient means.

References Cited by the Examiner

UNITED STATES PATENTS

| | | | |
|---|---|---|---|
| 1,248,630 | 12/17 | Davis. | |
| 1,555,350 | 9/25 | Bolin | 188—170 |
| 1,794,461 | 3/31 | Jackson | 188—170 |
| 2,311,842 | 2/43 | Larson | 188—170 |
| 2,631,266 | 3/53 | Britt | 188—170 |

MILTON BUCHLER, *Primary Examiner.*

DUANE A. REGER, ARTHUR L. LA POINT,

*Examiners.*